UNITED STATES PATENT OFFICE.

JAMES M. JENNINGS, OF ELIZABETH, NEW JERSEY, ASSIGNOR TO STANDARD OIL COMPANY, OF BAYONNE, NEW JERSEY, A CORPORATION OF NEW JERSEY.

FOAM COVERING FOR PREVENTING THE EVAPORATION OF STORED LIQUIDS.

1,423,721. Specification of Letters Patent. Patented July 25, 1922.

No Drawing. Application filed October 26, 1921. Serial No. 510,627.

*To all whom it may concern:*

Be it known that I, JAMES M. JENNINGS, a citizen of the United States, residing at 907 Colonial Road, Elizabeth, in the county of Union and State of New Jersey, have invented a new and useful Improvement in Foam Coverings for Preventing the Evaporation of Stored Liquids, of which the following is a specification.

The present invention relates to the art of preparing foams and more particularly foams of substantially permanent or stable character suitable for use as coverings for volatile liquids, or liquids containing volatile constituents, such as gasoline, crude petroleum and the like, for preventing evaporation therefrom. Such foams, may in accordance with the present invention, be permanently fluent, or may be substantially fixed or gelled in nature.

In accordance with the present invention a foam is prepared by whipping or beating a liquid base containing a suitable proportion of body-forming materials such as glue, dextrines, carbo-hydrates and the like, together with a small proportion of a setting agent active with respect to at least one of the body-forming materials of the foam liquids. The proportion of the setting compound or material may be varied to produce a foam which is permanently fluent, or one the liquid phase of which is fixed or gels. In the foam of the present invention, the proportion of the added water is not higher than 10%, and undue increase of the water content may be avoided by omitting from the liquid hygroscopic or deliquiescent inorganic compounds such as calcium chloride, which I have employed in certain specific compositions described in my prior application No. 427,297 of May 24, 1921 as peptizing agents. The foaming power of the liquid may be increased by the addition of suitable foaming agents, such as saponin, soap bark or soaps of the sulfonic compounds resulting from the treatment of mineral oils with fuming sulfuric acid. It is usually desirable also to add a small proportion of a preservative agent, such as borax or mercuric chloride.

The liquid base for preparation of a foam in accordance with the present invention may suitably be prepared by the admixture in the proper manner of 40 to 81% of glucose, 6 to 12% of water, 5 to 10% of glue and 0.1 to 2% of a suitable setting agent, such as ferrus sulfate. In this liquid there may also be included up to 40% of glycerine, if desired, although glycerine may be entirely omitted if the higher proportions of glucose are employed. From 0.5 to 1.5% of a suitable foaming agent, such as a soap of a mineral oil sulfonic compound, may also be added and in general the addition of a small proportion of a preservative agent is desirable. The proportion of preservative agent will, of course, depend upon the specific preservative employed. About 1% of borax has been found to be satisfactory, or about 0.1% of mercuric chloride. With proportions of the setting agent, ferrous sulfate, for example, below about 0.5%, the foam produced is permanently fluent in character; with proportions above about 0.5% it tends to become fixed or gelled.

In preparing the foam, the glue, the foaming agent, and the preservative are dissolved in the greater portion of the water. If glycerine is employed, it may be mixed with the glucose. The setting agent may be dissolved separately in a small portion of the water. The three solutions are then mixed and thoroughly agitated together and rapidly passed through a whipping or beating apparatus which produces a foam. If the proportion of the setting agent is such as to produce a fixed or gelled foam, the foam must be applied as soon as possible on the surface of the liquid from which evaporation is to be prevented, before gelling of the foam takes place.

In the preparation of foams in accordance with the present invention, those which I have as yet found to be the most stable or permanent contain from 55 to 70% of glucose from 10 to 20% of glycerine, 6 to 7.5% of glue, and a suitable setting agent, such as ferrous sulfate, with a foaming agent and a small proportion of a preservative. For permanent fluent foams the proportion of setting agent may be from 0.2 to 0.5%. As specific examples of foam liquids in accordance with the present invention, the following are noted.

Example No. 1.

Glucose 60%; glycerine 25%; glue 6.5%; water 7.2%; soap of mineral oil sulfonic acid 1%; ferrous sulfate 0.2%; mercuric chloride 0.1%.

In preparing the foam the glucose and the glycerine are mixed; the glue, soap and mercuric chloride are dissolved in the greater portion of the water and the ferrous sulfate is dissolved in the remainder. The three components are then mixed together and immediately passed through a beater or foam producer, and the resulting foam is stable and permanently fluent. By increasing the proportion of ferrous sulfate above 0.5%, say to 1.5 or 2%, the liquid phase of the foam will rapidly gel or become fixed, resulting in a nonfluent foam.

*Example No. 2.*

Glucose 70%; glycerine 11%; glue 7.5%; water 9.3%; foaming agent (sulfonic acid soap) 1%; borax 1% and ferrous sulfate 0.2%.

The procedure in preparing the foam is substantially that indicated in connection with Example No. 1.

The glucose employed in the preparation of these foams may suitably be the commercial product, containing 15 to 20% of water. The glycerine employed is preferably the commercial grade known as soap-lye glycerine.

Although the present invention has been described in connection with specific examples illustrating it, it is not intended that the details of these examples shall be regarded as limitations upon the scope of the invention, except in so far as included in the accompanying claims.

I claim:

1. A liquid for producing stable foams comprising from 40 to 81% of glucose, from 6 to 12% of water, from 5 to 10% of glue and a small proportion of a setting agent.

2. A liquid for producing stable foams comprising from 40 to 81% of glucose, from 6 to 12% of water, from 5 to 10% of glue, not more than 40% of glycerine and not more than 2% of ferrous sulfate.

3. A liquid for producing stable foams comprising from 40 to 81% of glucose, from 6 to 12% of water, from 5 to 10% of glue, not more than 40% of glycerine and not more than 2% of ferrous sulfate together with a small proportion of a foaming agent and a preservative.

4. A liquid for producing stable foams comprising from 55 to 70% of glucose, from 10 to 25% of glycerine, from 6 to 7.5% of glue, not more than 2% of ferrous sulfate together with a small proportion of a foaming agent and a preservative.

5. A liquid for producing a stable fluent foam comprising from 55 to 70% of glucose, from 10 to 25% of glycerine, from 6 to 7.5% of glue, from 0.2 to 0.5% of ferrous sulfate together with a small proportion of a foaming agent and a preservative.

6. A liquid for producing a permanent fluent foam comprising 60% of glucose, 25% of glycerine, 7.2% of water, 6.5% of glue, 1% of sulfonic acid soap, 0.2% of ferrous sulfate and a preservative.

7. A liquid for producing a stable fluent foam comprising 70% of glucose, 11% of glycerine, 9.3% of water, 7.5% of glue, 0.2% of ferrous sulfate, 1% of sulfonic acid soap and a preservative.

8. A stable foam having as its continuous phase a liquid comprising from 40 to 81% of glucose, from 6 to 12% of water, from 5 to 10% of glue and a small proportion of a setting agent.

9. A stable foam having as its continuous phase a liquid comprising from 40 to 81% of glucose, from 6 to 12% of water, from 5 to 10% of glue, not more than 40% of glycerine and a small proportion of a setting agent.

10. A stable foam having as its continuous phase a liquid comprising from 55 to 70% of glucose, from 10 to 25% of glycerine, from 6 to 7.5% of glue and not more than 2% of ferrous sulfate.

11. A stable foam having as its continuous phase a gel liquid comprising from 55 to 70% of glucose, from 10 to 25% of glycerine, from 6 to 7.5% of glue and from 0.5 to 2% of ferrous sulfate.

12. A stable fluent foam having as its continuous phase a liquid comprising from 55 to 70% of glucose, from 10 to 25% of glycerine, from 6 to 7.5% of glue and from 0.2 to 0.5% of ferrous sulfate.

13. A stable fluent foam having as its continuous phase a liquid comprising 70% of glucose, 11% of glycerine, 9.3% of water, 7.5% of glue, 0.2% of ferrous sulfate with a foaming agent and a preservative.

JAMES M. JENNINGS.